(No Model.)
E. WOOLSON.
RIVET JOINT.
No. 264,502.  Patented Sept. 19, 1882.
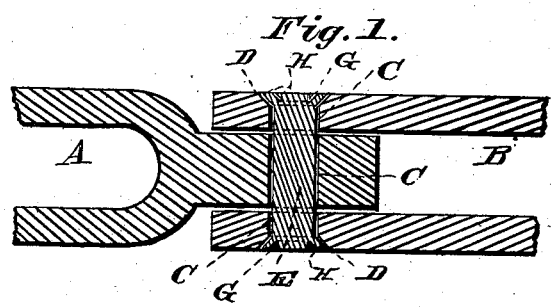
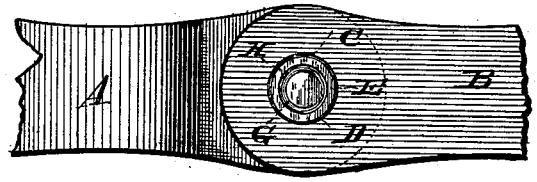
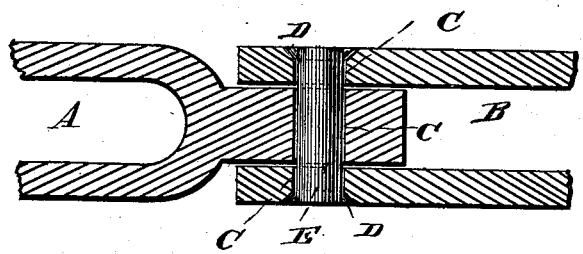
WITNESSES:
Fred. G. Dieterich
P. C. Dieterich
INVENTOR.
Egbert Woolson
by C. A. Snow & Co
ATTORNEYS.
N. PETERS, Photo-Lithographer, Washington, D. C.

UNITED STATES PATENT OFFICE.

EGBERT WOOLSON, OF BROOKLYN, NEW YORK.

RIVET-JOINT.

SPECIFICATION forming part of Letters Patent No. 264,502, dated September 19, 1882.

Application filed March 31, 1882. (No model.)

*To all whom it may concern:*

Be it known that I, EGBERT WOOLSON, of Brooklyn, in the county of Kings and State of New York, have invented certain new and useful Improvements in Rivet-Joints; and I do hereby declare that the following is a full, clear, and exact description of the invention, which will enable others skilled in the art to which it appertains to make and use the same, reference being had to the accompanying drawings, which form a part of this specification.

Figure 1 is a sectional view showing the ends of two chain-links connected by my improved rivet-joint. Fig. 2 is a side view of the same, showing one of the ends or heads of the rivet. Fig. 3 is a sectional view showing the rivet in position before being headed.

Corresponding parts in the several figures are denoted by like letters of reference.

This invention relates to certain improvements in rivet-joints; and it has for its object to make a very strong and durable joint, as will be hereinafter more fully described, and particularly pointed out in the claim.

In the drawings hereto annexed, A and B represent the ends of two chain-links connected by my improved rivet-joint, so as to form part of an endless chain. These links have been chosen only for the purpose of illustrating my invention, which it will be understood may be used for all purposes to which ordinary rivets may be applied.

The links A B have openings C countersunk at their outer ends, as shown at D, to receive the rivet. The latter, which is denoted by letter E, consists of a plain cylindrical pin of suitable dimensions to fit nicely in the openings C, with its ends, which are flat and smooth, flush with the ends of said opening.

G G are grooves formed in the ends of the rivet, by which a portion of the metal forming the heads H is set into, so as to completely fill the countersinks D.

The advantages of my invention over the ordinary rivet-joints formed by swaging the metal down by means of a hammer will be readily understood. By this latter method the countersink is never completely filled, and the rivet may be easily driven out by means of a punch, whereas by my invention the attempt at driving the rivet out by means of a punch will only tend to set the metal from the central portion of the end of the rivet into the groove G, thus making the fastening more firm.

In order to remove the rivet it will be found necessary, first, to chisel off the head H, after which it may be driven out. The saving of time over the old method of forming rivet-heads is also considerable.

I am aware that rivets have heretofore been clinched by striking up circular grooves in their ends, forming projecting beads. I am also aware that ordinary rivets have been placed in countersunk openings and clinched, so as to force the metal of the rivet into the countersink; but I am not aware that the construction herein described has been ever before known or used, whereby a smooth, flush, and very strong joint is formed.

Having thus described my invention, I claim and desire to secure by Letters Patent of the United States—

The combination, with the parts A B, having openings C, countersunk at their outer ends, as at D, of the rivet E, consisting of a plain cylindrical stem, having its ends flush with the ends of opening C, and provided with grooves G and heads H, completely filling the countersinks D, as set forth.

In testimony that I claim the foregoing as my own I have hereto affixed my signature in presence of two witnesses.

EGBERT WOOLSON.

Witnesses:
E. N. PHELPS,
ROBERT LUNNY, 2d.